United States Patent

Maxwell

[15] 3,689,181
[45] Sept. 5, 1972

[54] METHOD AND APPARATUS FOR MIXING AND EXTRUDING VISCO-ELASTIC MATERIALS

[72] Inventor: Bryce Maxwell, Princeton, N.J.
[73] Assignee: USM Corporation, Boston, Mass.
[22] Filed: Jan. 22, 1970
[21] Appl. No.: 4,876

[52] U.S. Cl. .................................. 425/207, 425/376
[51] Int. Cl. .......................... B29f 3/012, B29f 1/022
[58] Field of Search ....18/12 C; 1/30 JM, 376, 30 JS; 264/176, 349; 425/207

[56] References Cited

UNITED STATES PATENTS

| | | |
|---|---|---|
| 2,695,246 | 11/1954 | Jurgensen et al. ......264/349 X |
| 3,009,685 | 11/1961 | Rettig..................18/12 C UX |
| 3,079,635 | 3/1963 | Adams....................264/349 X |
| 3,253,300 | 5/1966 | Gove et al. ..............18/12 C X |
| 3,577,841 | 5/1971 | Massy..........................18/12 C |

*Primary Examiner*—J. Spencer Overholser
*Assistant Examiner*—Norman Lehrer
*Attorney*—Kenyon & Kenyon Reilly Carr & Chapin

[57] ABSTRACT

Mixing characteristics of an elastic melt extruder are improved by providing, in the opposing, spaced-apart walls of a rotor and a stator, shaped recesses arranged annularly about the axis of rotation. During processing, the visco-elastic material, generally travelling radially inward between the wall surfaces of the rotor and the stator, is accelerated into the recesses and mixed together before it is caused to move in toward the center of the gap and continue its radial inward movement with the mass of material.

3 Claims, 6 Drawing Figures

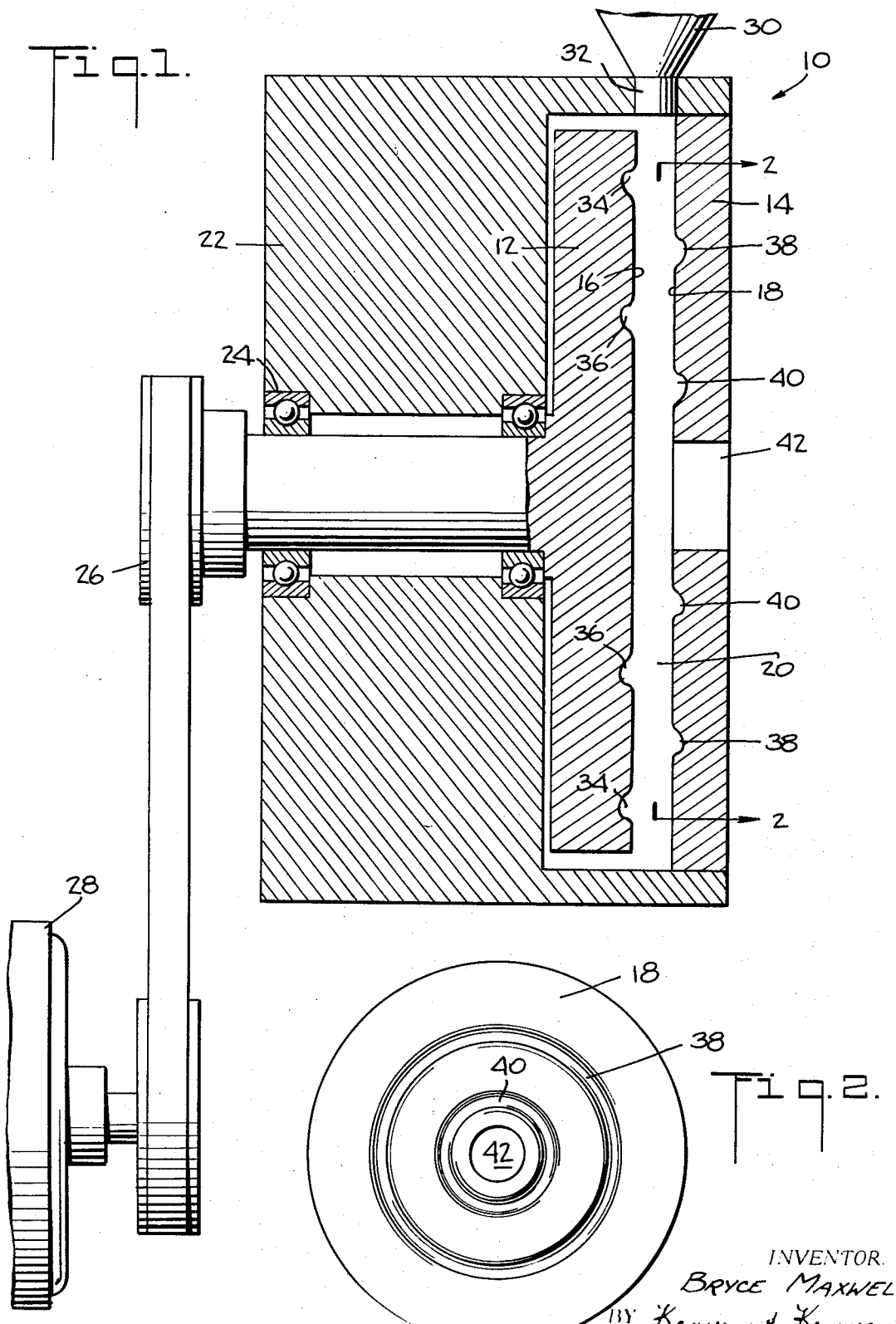

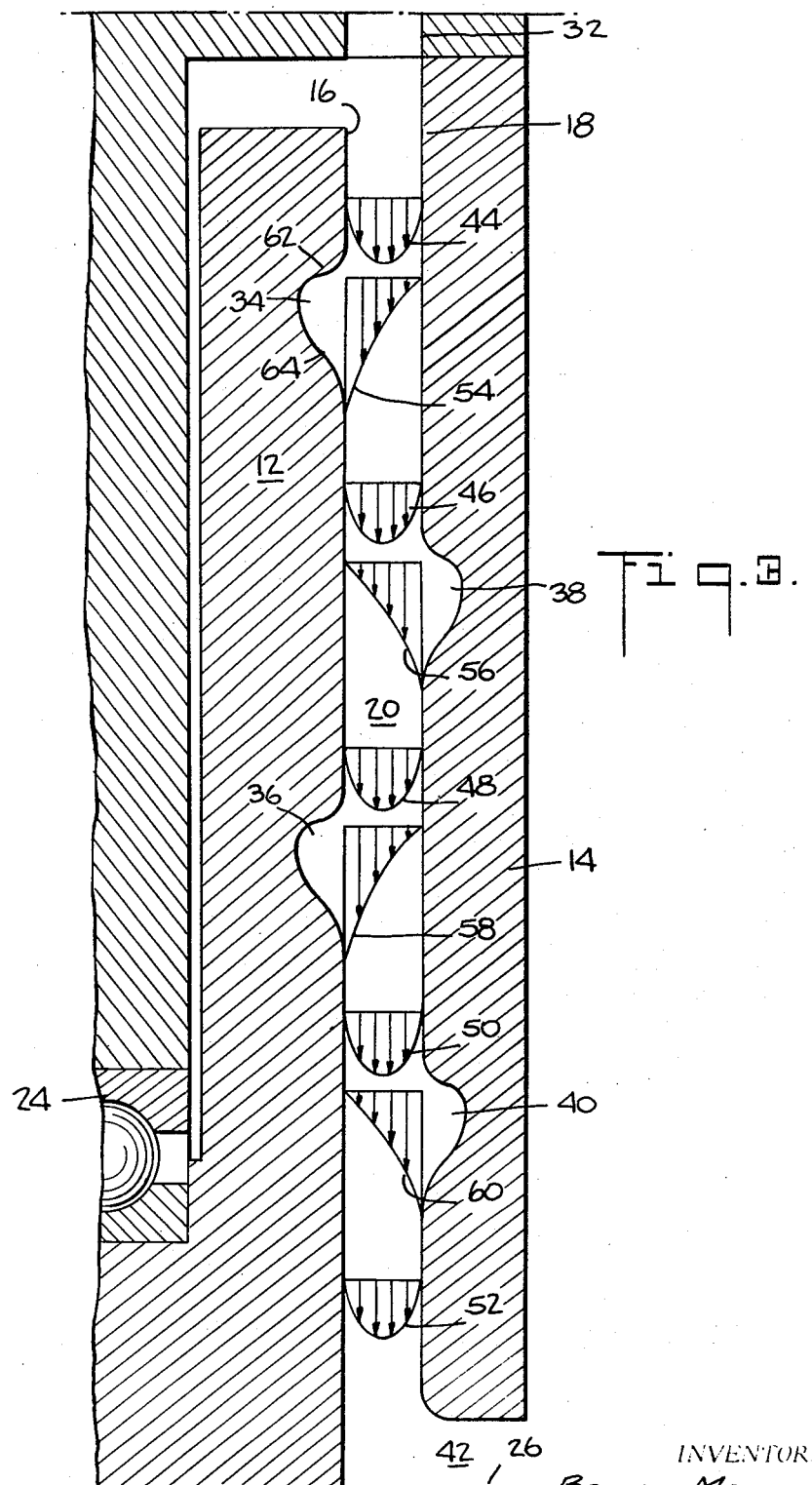

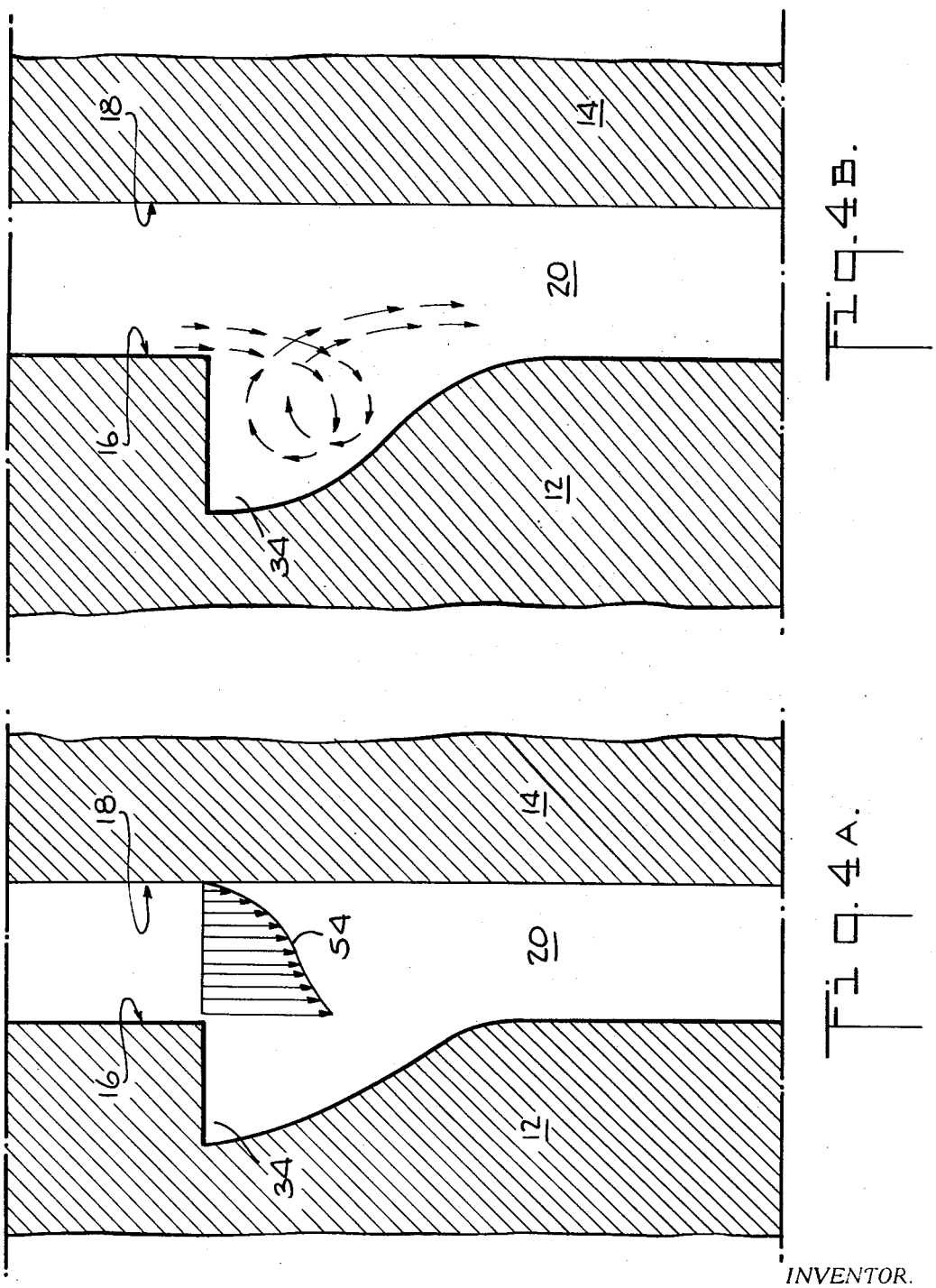

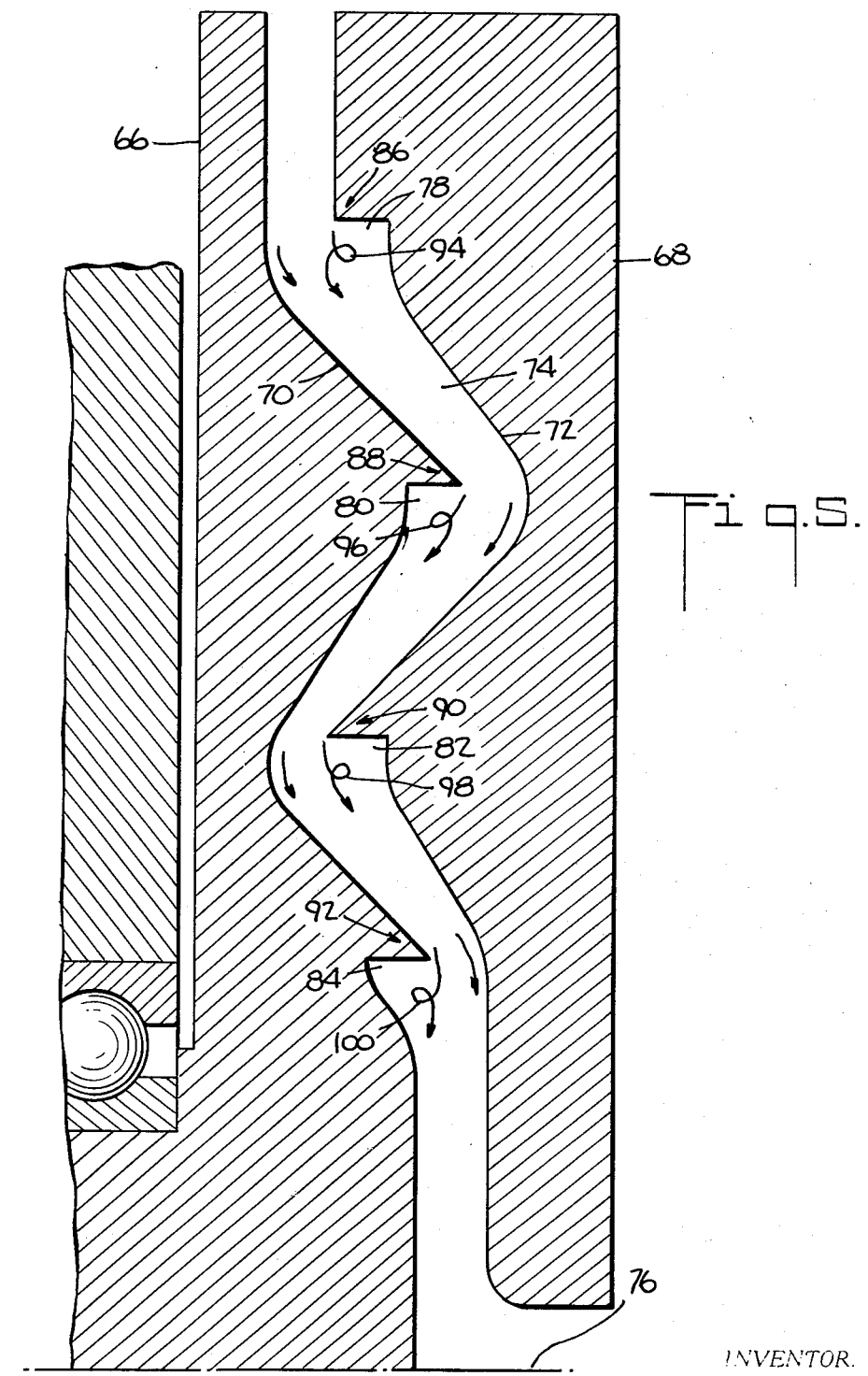

3,689,181

METHOD AND APPARATUS FOR MIXING AND EXTRUDING VISCO-ELASTIC MATERIALS

BACKGROUND OF THE INVENTION

The present invention relates to the extrusion of visco-elastic materials, and more particularly to a method and apparatus for accomplishing mixing of such materials prior to final extrusion.

The extrusion of materials includes the mixing, compounding and transporting of materials, as well as the changing of the conditions or state of materials by the addition of heat and pressure. A type of mixing extruder, commonly known as the "elastic melt extruder," is described in the "Modern Plastics Magazine" issue of October 1959, in an article by Bryce Maxwell and Anthony J. Scalora, and in U.S. Pat. No. 3,046,603 issued to Bryce Maxwell on July 31, 1962. The elastic melt extruder utilizes "the normal force effect" based on the principle that when a visco-elastic material is sheared between a rotating surface and a relatively stationary surface, a centripetal force is developed which causes the material being processed to be extruded through an outlet centrally located in one of the two members.

More particularly, in the general method of extrusion, plastic pellets or other materials of a similar nature are fed through a hopper to a cup-shaped container, sometimes referred to as a stator. Heating elements can be employed to assist in melting the pellets into a liquid mass. A cylindrical rotor is rotatably mounted in the container with its bottom face spaced apart from the bottom wall of the container to provide a gap through which the liquid flows. Also, a discharge opening is provided in the bottom of the container near the axis of rotation of the rotor. Rotation of the rotor relative to the container causes the liquid in this gap to become sheared. As the rotational speed is increased, the shearing stress is increased, and a force normal to this stress is developed between the bottom face of the rotor and the bottom wall of the container. The force developed results from a centripetal pumping action which produces sufficient force on the visco-elastic material to effect the extrusion. Also, the rotor is anchored against axial displacement so that this normal force will be effectively used in the pumping and extrusion of the material out of the discharge opening through an extrusion die.

While the mixing characteristics of the conventional elastic melt extruder are generally very good, due to the volume flow of material being perpendicular to the direction of shear, it has been found that the material located adjacent and in contact with the surfaces of the rotating member and the relatively stationary member, hereinafter referred to as the rotor and the stator, respectively, are not very well mixed since the centripetal velocity of such materials is at a minimum at the surfaces of such rotor and stator, and since there is little mixing movement perpendicular to such surfaces.

OBJECTS

Therefore, it is an object of the present invention to provide a method and apparatus for improving the mixing characteristics of the elastic melt extruder.

It is a further object to provide a method and apparatus for improving the mixing characteristics of the elastic melt extruder, particularly in the areas adjacent to the surfaces of the rotor and stator.

SUMMARY OF THE INVENTION

These and other objects which will become apparent from the detailed disclosure and claims to follow are achieved by the present invention which provides a method for mixing visco-elastic materials in an elastic melt extruder, comprising feeding a visco-elastic material into the gap formed between the rotor and stator surfaces of the extruder and causing an alternating mixing of the material near the rotor and stator wall surfaces as such material is centripetally accelerated towards the axis of rotation of said rotor.

Also, the present invention provides in an apparatus for extruding a visco-elastic material, first and second members with walls providing surfaces spaced from and facing each other in close proximity; means for rotating at least one of the members relative to the other to shear the visco-elastic material between such surfaces at a rate sufficient to produce a centripetal force in excess of the centrifugal force on the material and thereby cause a flow of said material toward the axis of rotation; means for feeding visco-elastic material into the gap between said surfaces; and a discharge opening formed through one of said members near the axis of rotation; the improvement of which comprises: providing in such surfaces of the first and second members, recesses defined by recessed surface portions extending inward from such spaced apart surfaces, such recessed portions forming surfaces of revolution about the axis of rotation. During processing, the visco-elastic material which is in intimate contact with or adjacent the surfaces loses contact with such surfaces as it is accelerated into the recesses and mixed together. The material in the recess is then accelerated out of the recess toward the center of the gap where it continues its radial inward movement with the mass of material.

THE DRAWINGS

FIG. 1 is a vertical cross-sectional view of the elastic melt extruder, illustrative of the invention;

FIG. 2 is a vertical view, taken on line 2—2 of FIG. 1, showing the annular recess areas formed in the stator wall;

FIG. 3 is a cross-sectional view of the gap formed between the rotor and stator surfaces, with the centripetal velocity profiles indicated at various points in the gap;

FIG. 4A shows a close-up view of a centripetal velocity profile of the material in the gap near the beginning of the recess; and FIG. 4B shows the paths of the particles of material in the area of the recess; and FIG. 5 shows a cross-sectional view of another embodiment of the rotor and stator design of the invention.

DESCRIPTION OF THE PREFERRED EMBODIMENTS

Referring to the drawings, there is shown, in FIGS. 1 and 2, the elastic melt extruder 10 of the invention. Extruder 10 comprises two members 12 and 14 providing a relative rotative motion therebetween, such as a rotor 12 and a stator 14. Rotor 12 and stator 14 have working surfaces 16 and 18, respectively, spaced apart from each other and facing each other in close proximity so as to provide a gap 20 between such surfaces 16 and 18. Stator 14 is fixedly attached to stationary member 22, while rotor 12 rotates on bearings 24 about an axis of rotation 26 as it is driven by a motor 28. The material for processing is fed into a material supply hopper 30 mounted on top of the stationary member 22 with its opening in communication with a hole 32 extending through the top portion of member 30 and terminating in the gap 20. The material thus passes through the opening 32 and into the gap 20 at a point near the periphery of the rotor 12.

It is to be understood that means suitable for driving the rotor 12 and for feeding material into the gap 20, other than those shown and described, can be employed in carrying out the invention. Also, heating means, not shown, can be employed to assist in melting the material into a liquid mass.

A plurality of recesses 34 and 36, and 38 and 40, respectively, are provided in the surfaces 16 and 18, respectively. These recesses 34, 36, 38 and 40 are formed by surfaces of revolution about the axis of rotation 26. Preferably, the recesses 34 and 36 on the rotor 12 are alternated between the recesses 38 and 40 along the gap 20 in a generally radial direction. Thus, the diameter of the annular ring formed by each recess varies in size from the rotor to the stator and back to the rotor, and so on, as the ring diameters increase or decrease. In this fashion, as the material passes from the hopper 30 towards a discharge opening 42 provided in the stator 14 near the location of the axis of rotation 26, such material will first pass by the recess 34 on the rotor 12, then the recess 38 on stator 14, then the recess 36 on rotor 12 and finally the recess 40 on stator 14, thus alternating from side to side across the gap 20.

Referring to FIG. 3, there is shown the velocity profiles of the material at various locations in the gap 20. Specifically, the radial velocity profiles 44, 46, 48, 50 and 52 indicate the relative magnitudes of the centripetal velocity of the material at points across the gap between the rotor 12 and stator 14 where the recess are not provided. As indicated by the velocity profiles 44-52, the centripetal velocity of the material in the elastic melt extruder 10 is at a minimum at points on the surfaces 16 and 18. As a result, the material located at the surfaces 16 and 18 is not effectively mixed into the mass of the visco-elastic material being processed.

The recesses 34, 36, 38 and 40 provide a means for improving the mixing characteristics of the extruder 10, particularly in the areas close to the surfaces 16 and 18, as illustrated in FIG. 3 by the velocity profiles 54, 56, 58 and 60. The material located in intimate contact with and adjacent the surfaces 16 and 18 loses contact with said surfaces 16 and 18 as it moves past the recesses 34, 36, 38 and 40 and is accelerated centripetally by the elastic melt effect. Thus, the centripetal velocity profiles 54, 56, 58 and 60 of the material are greatly increased in the area of any one of the recess 34, 36, 38 and 40. FIG. 4A is a close-up view of the profile 54 of the material near the beginning of the recess 34. This disruption of the normal velocity profiles 44, 46, 48, 50 and 52 causes the materials that were close to the surfaces 16 and 18, and in the area of the recesses, to first move into the recesses and be mixed with adjacent material in a turbulent manner, then to continue its radially inward movement due to the centripetal forcing action of the shear field. The paths taken by particles of the material in one example are illustrated in FIG. 4B.

Thus, the overall effect of the recesses 34–40 is to produce an alternating mixing of the material near the surfaces of the rotor and the stator.

As noted previously, the recesses 34, 36, 38 and 40 are formed by surfaces of revolution about the axis of rotation 26. Each recess, such as 34 shown in FIG. 3, has a shape defined by the recessed wall portions comprising upstream portion 62 and downstream portion 64. The upstream recess portion 62 curves smoothly inward from the wall surface 16, and the downstream recess portion 64 gradually slopes from within the recess 34 out to where it meets the wall surface 16 at the downstream side of the recess 34. While variations in the specific shape of the recessed wall portions 62 and 64 will also provide the improved mixing characteristics desired, a rectangular shaped recess having sharp corners on the downstream end portion 64 will not be suitable for this purpose since a buildup of the material might occur in the downstream corners of such recess areas. However, the recess shapes shown in FIGS. 4A and 4B with a sharp corner on the upstream end portion and a smooth downstream end portion which gradually meets the wall surface 16 will also be suitable.

It is to be pointed out that while the figures show rotor and stator wall surfaces each having two annular recess therein, either more or less than this number can be employed. However, it is desirable that at least one recess should be provided on both the rotor and stator wall surfaces so as to produce a back and forth movement of the material toward the rotor and stator wall surfaces 16 and 18 on at least one occasion.

Referring to FIG. 5, there is shown a modification of the rotor and stator design shown and discussed in reference to FIGS. 1–3. More particularly, the rotor 66 and stator 68 provide wall surfaces 70 and 72 which are spaced apart so as to form a gap 74. Wall surfaces 70 and 72 are contoured to provide a convoluted path for the visco-elastic material so that such material progresses back and forth along oblique angles with respect to the axis of rotation 76. In this embodiment, a plurality of recesses 78, 80, 82 and 84 are provided in the rotor and stator surfaces 70 and 72 at the locations 86, 88, 90 and 92 where each bend occurs in the gap 74, and in the inner wall of each bend. As the material passes each corner or bend 86–92, the mixing is improved by acceleration of the material along paths 94, 96, 98 and 100. The principles of operation of this embodiment are essentially the same as those discussed in reference to the embodiment of FIGS. 1–4.

While the specific embodiments of the invention have been shown and described in detail to illustrate the application of the invention principles, it is to be understood that the invention may be embodied otherwise without departing from such principles.

I claim:

1. In an apparatus of the type known generally as an elastic melt extruder for extruding a visco-elastic material having first and second members with surfaces spaced from and facing each other in close proximity; means for rotating at least one of said members relative to the other to shear the visco-elastic material between said surfaces at a rate sufficient to produce a centripetal force in excess of the centrifugal force on the material and thereby cause a flow of said material toward the axis of rotation of the rotating member;

means for feeding visco-elastic material into the gap between said surfaces; and a discharge opening formed through one of said members near said axis of rotation; the improvement of which comprises: recesses in said walls of said first and second members, said recesses defined by recessed portions extending inward from said spaced apart surfaces, said recessed portions forming surfaces of revolution about said axis of rotation, said recessed wall portions defining each recess comprising an upstream portion and a downstream portion, said upstream recess portion curving inward from said wall surface and said downstream recess portion gradually sloping from within said recess out to where it meets said wall at the downstream side of said recess, whereby the visco-elastic material in intimate contact with or adjacent said walls loses contact with said wall surfaces as it is accelerated centripetally past said recesses, and such material located in the area of said recess is also caused to move away from said recessed wall portions towards the center of the gap and be mixed with the mass of material.

2. Apparatus for extruding a visco-elastic material as recited in claim 1, wherein the surfaces of said first and second members are contoured to provide a gap between said surfaces which progresses back and forth along oblique angles with respect to said axis of rotation, thereby providing a convoluted path for the material.

3. Apparatus for extruding a visco-elastic material as recited in claim 2, wherein there is provided a recess at each of a plurality of points where a bend is located in said gap, each recess being in the wall on the inside of the bend at which it is located.

* * * * *